Figure 1:
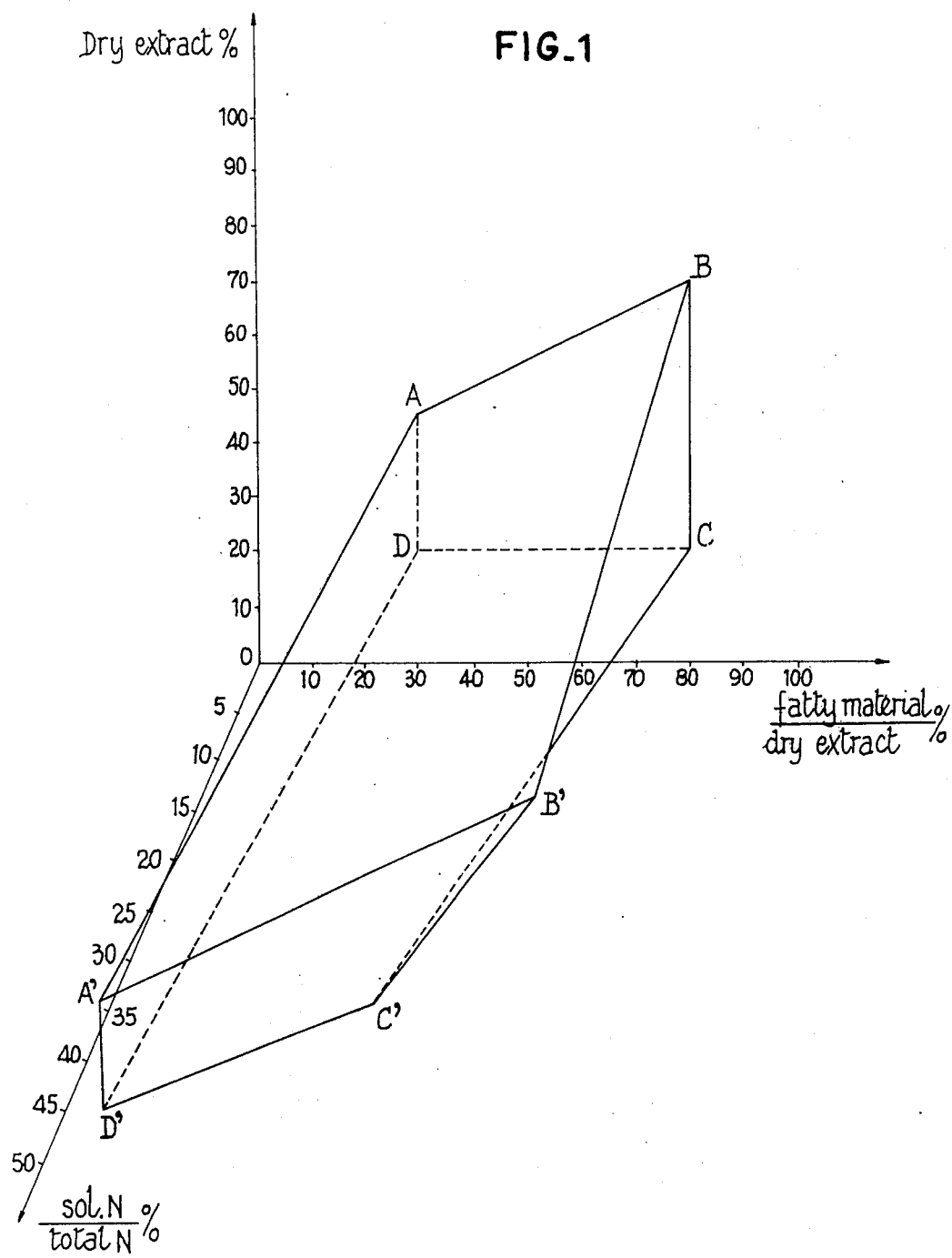

United States Patent [19]

Coste

[11] 3,985,902

[45] Oct. 12, 1976

[54] PROCESS FOR PREPARING A FOOD PRODUCT

[75] Inventor: Gilbert Coste, Annecy-le-Vieux, France

[73] Assignee: Fromageries Picon, Saint-Felix, France

[22] Filed: May 31, 1974

[21] Appl. No.: 475,247

Related U.S. Application Data

[63] Continuation-in-part of Ser. No. 316,505, Dec. 19, 1972, abandoned.

[30] Foreign Application Priority Data

Dec. 22, 1971 France .............................. 71.46090

[52] U.S. Cl. ............................. 426/582; 426/442; 426/474; 426/519
[51] Int. Cl.² .......................................... A23C 19/00
[58] Field of Search ........... 426/163, 186, 317, 361, 426/582, 442, 474, 602, 603, 519

[56] References Cited
UNITED STATES PATENTS

| | | | |
|---|---|---|---|
| 2,081,273 | 5/1937 | Hoermann | 426/186 |
| 2,714,069 | 7/1955 | Stuart | 426/163 |
| 2,882,168 | 4/1959 | Rossi | 426/582 |
| 3,072,489 | 1/1963 | Hurlburt | 426/474 |
| 3,635,733 | 1/1972 | Kichline | 426/582 |

FOREIGN PATENTS OR APPLICATIONS 999,150  7/1965  United Kingdom

*Primary Examiner*—Norman Yudkoff
*Assistant Examiner*—Martin G. Mullen
*Attorney, Agent, or Firm*—Wenderoth, Lind & Ponack

[57] ABSTRACT

Process for preparing a food product in the form of a mousse without the use of stabilizers, comprising mixing ingredients employed for preparing a processed cheese containing 1–3% of polyphosphates at a temperature of 95°–100°C, thereafter whipping the mixture at a temperature of 75°–85°C in an inert gas, the ingredients being chosen in such manner that the mixture has, at 95°C before the whipping, a viscosity of 20–50 poises.

3 Claims, 2 Drawing Figures

PROCESS FOR PREPARING A FOOD PRODUCT

The present invention is a Continuation-In-Part of patent application Ser. No. 316,505 filed Dec. 19, 1972 and now abandoned.

The present invention relates to a process for preparing a food product in the form of a mousse or foam based on processed or melted cheese and the product obtained by means of this process.

Processes are known for preparing food products in the form of mousse by mechanically incorporating gas in the products. However, the solubility of the gases in these products decreases with temperature and usually there is produced a desorption of the gas in the course of the cooling and therefore a marked decrease in the swelling. This property practically precludes formulation of the product above 65° C. Now, at a lower temperature, the risks of bacteriological recontamination are high and render a prolonged preservation of the product difficult.

A process whereby this drawback is reduced consists in adding to the product thickeners such as starchy material or jellifiers such as carrageenates and alginates. These additives increase the viscosity of the product and reduce the settling of the swelled product in the course of its cooling.

An object of the present invention is to provide a process for preparing a food product in the form of a mousse based on processed cheese at a temperature higher than 65° C and without use of stabilizers such as jellifiers and thickeners.

By processed cheese is meant products derived from the melting of cheeses to which are optionally added other dairy products such as powdered milk, cream, butter, casein, lactoserum, by the hot mixing of these products with the melting salts. As melting salts there are most often employed polyphosphates and in particular sodium phosphates.

These processed cheeses may be characterized by the dry extract content, the fatty material content of the extract and the content of soluble nitrogen with respect to the total nitrogen, that is to say, the rate of degradation of the casein.

The process according to the invention comprises mixing the ingredients employed for preparing a processed cheese containing 1-3% of polyphosphates at a temperature of 95-110° C, thereafter whipping the mixture obtained at a temperature of 75-85° C in an inert gas, said ingredients being so chosen that the mixture has at 95° C before the whipping a viscosity of 20-50 poises.

It has been found surprisingly that when the ingredients are chosen in such a way that the mixture has such viscosity before the whipping, this viscosity increases very considerably during cooling under the indicated conditions and permits the obtainment of a whipped product which has a foaming coefficient (ratio between the density before and after whipping) of 1.2-2 and does not settle. The viscosity is then high enough to avoid any desorption of the gas. On the other hand, when the chosen ingredients give viscosities before whipping lower than 20 poises, this viscosity increases very little in the course of the cooling and does not permit the obtainment of a sufficiently rigid texture to maintain in the product the gas injected in the course of the whipping. The foaming coefficient is less than 1.2, the desorption of the gas is very rapid and the product consequently settles.

To obtain a viscosity of 20-50 poises before the whipping, it is well to choose the ingredients in an appropriate manner, that is to say, to regulate in an appropriate manner the parameters characterizing them which have been mentioned before, namely the dry extract, the fatty material content in the dry extract and the content of soluble nitrogen.

It has been found that, in practice, these parameters should be chosen in such manner that the representative point in a system of tridimensional coordinates having for coordinates the three parameters dry extract, fatty material content with respect to the dry extract and the content of the soluble nitrogen with respect to the total nitrogen is situated within a volume ABCD − A'B'C'D' shown in FIG. 1.

The characteristic points A....D have the following coordinates:

|    | Dry Extract | Fatty material / Dry extract | Soluble nitrogen / Total nitrogen |
|----|-------------|------------------------------|-----------------------------------|
| A  | 45          | 30                           | 0.5                               |
| B  | 70          | 80                           | 0.5                               |
| C  | 20          | 80                           | 0.5                               |
| D  | 20          | 30                           | 0.5                               |
| A' | 30          | 10                           | 50                                |
| B' | 70          | 90                           | 50                                |
| C' | 30          | 60                           | 50                                |
| D' | 10          | 10                           | 50                                |

Figure 2:
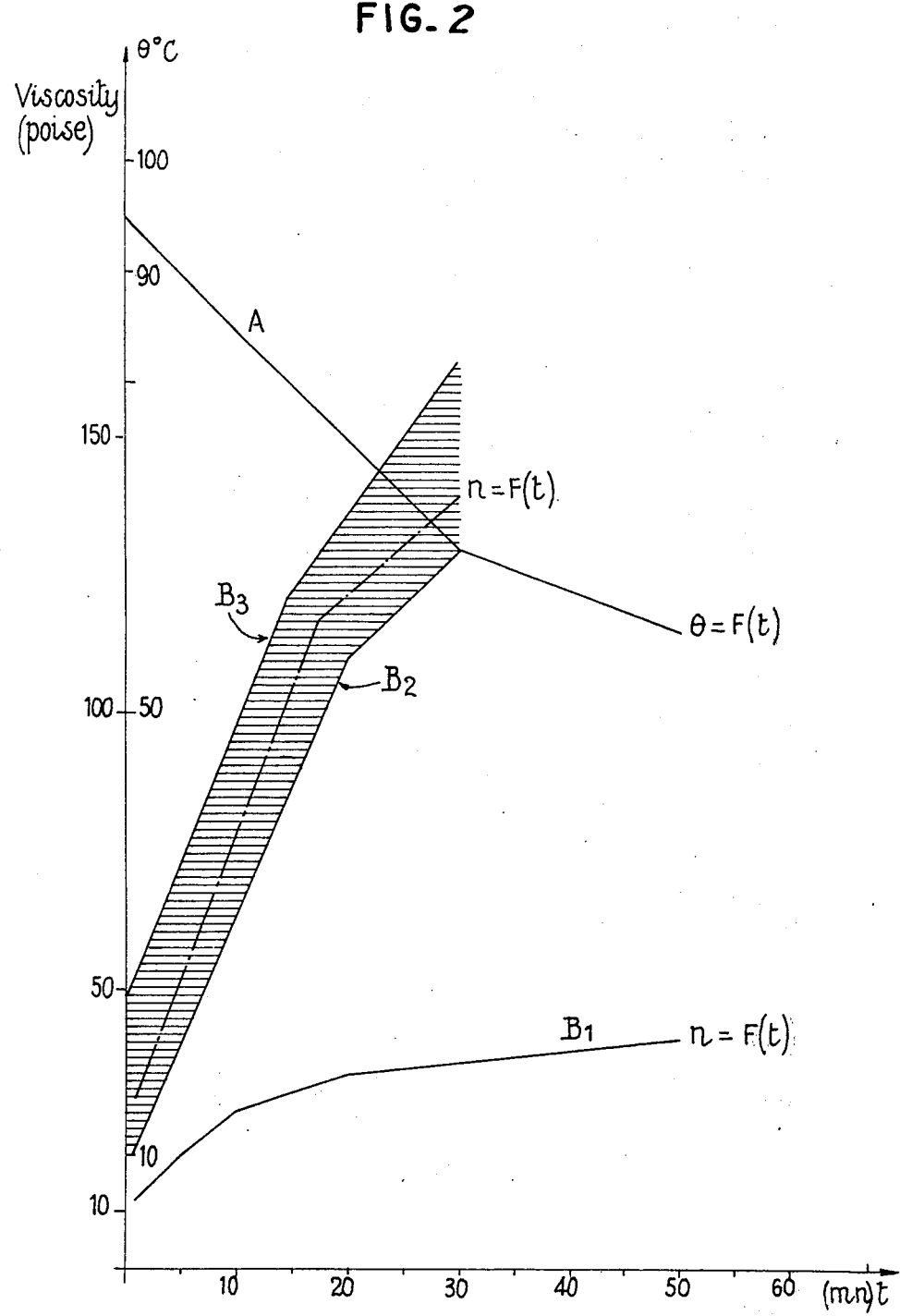

There has been shown in FIG. 2 the evolution of the viscosity of a processed cheese in the course of the cooling after the mixing (in the absence of whipping). The abscissae represent the time and the ordinates on one hand the viscosity and on the other hand the temperature ($\theta$). The curve A gives the evolution of the temperature. The curve $B_1$ shows the evolution of the viscosity in the case of a product having a viscosity at 95° C of 10 poises and the curves $B_2$ and $B_3$ show the evolution of the viscosity in respect of products having viscosities at 95° C of 20 and 50 poises respectively.

It will be observed that the viscosity increases considerably when the initial viscosity at 95° C is between 20 and 50 poises whereas it increases but very slightly in the case of a product having an initial viscosity of 10 poises.

It has been found that with products having a viscosity of 20-50 poises at 95° C there is obtained by whipping a foaming coefficient of 1.2-2, the viscosity of the product after whipping being 100-140 poises. On the other hand, with a product having a viscosity of 10 poises at 95° C, the foaming coefficient is less than 1.2 and the viscosity of the product is distinctly lower.

In fact, it is the judicious choice of the starting cheese materials as a function of their ratio $$\frac{\text{soluble nitrogen}}{\text{total nitrogen}},$$

in combination with the other two parameters dry extract and fatty material with respect to the dry extract, the latter being regulated by the appropriate adjustments (in particular the amount of water or butter added) which permits obtaining a correct foaming coefficient, that is to say, between 1.2 and 2.

In an advantageous manner of carrying out the invention, there are intimately mixed the cheese and possibly other dairy products such as powdered milk, cream, butter, casein, lactoserum and polyphosphates, the latter being so chosen that the final pH is between 5.10 and 5.80. After addition of the amount of water required for regulating the final dry extract of the product to the desired value, the mixture is heated to a temperature of about 95–110° C. This preliminary operation effects a pasteurization of the starting materials. It may be carried out in the whipping apparatus or in a separate apparatus.

The whipping operation is carried out at a temperature of 75–85° C whereby the product is formulated at a temperature above 65° C. There is employed in particular as inert gas nitrogen at pressures of 0.5–1.5 kg/sq.cm. The whipping time may be about 2–5 minutes and the whipping speeds of the order of 160–350 rpm.

The following examples illustrate the invention:

EXAMPLE 1

The following composition is employed:

| | Kg |
|---|---|
| - Cheese of the Cantal type (1) | 30.0 |
| - Skimmed milk powder | 1.5 |
| - Butter | 10.5 |
| - Sodium polyphosphates (2) | 1.6 |
| - Pre-melt | 1.0 |
| - Water | 21.3 |
| | 65.9 |
| (1) Analysis (% by weight) | |
| - Dry extract | 60% |
| - Fatty materials/dry extract | 53% |
| - Soluble nitrogen/total nitrogen | 10% |
| (2) Polyphosphate composition (% by weight) | |
| - Orthophosphates | 8.9 |
| - Pyrophosphates | 19.6 |
| - Triphosphates | 17.9 |
| - P = 4/5 | 29.3 |
| - P = 6/7 | 11.5 |
| - Higher polyphosphates | 12.8 |

This composition is mixed in a Stephan type kneader with direct injection of steam. The mixture is stirred for 10 minutes. At the end of the stirring, the temperature reaches 95° C. The viscosity of the mixture is then 30 poises. The analysis of the product at this stage is as follows:

| - Dry extract | 48% |
|---|---|
| - Fatty material/dry extract | 61% |
| - Soluble nitrogen/total nitrogen | 9% |
| - pH | 5.60 |

The whipping is then carried out in a Jurion type whipping machine under nitrogen in the following conditions:

| - temperature before whipping | 85°C |
|---|---|
| - Pressure | 1 kg/sq.cm. |
| - Speed | 340 rpm. |
| - Duration | 5 minutes. |

The product obtained, whose foaming coefficient is 1.2, is then put into small boat-shapes.

The product thus prepared has a duration of preservation exceeding 3 months at ordinary temperature.

EXAMPLE 2

The following composition is employed:

| | Kg |
|---|---|
| - Cream cheese (1) | 30 |
| - Casein | 1.5 |
| - Concentrated cream (2) | 7 |
| - Sodium polyphosphate | 0.4 |
| - Sodium citrate | 0.1 |
| - Water | 4.5 |
| Total | 43.5 |
| (1) Dry extract | 44.5% |
| Fatty material/dry extract | 58 % |
| (2) Fatty material | 650 g/kg |

This composition is mixed in a kneader of the Stephan type with direct injection of steam. The mixture is stirred for 10 minutes. At the end of the stirring the temperature reaches 95° C. The viscosity of the mixture is then 35 poises. The analysis of the product at this stage is as follows:

| - Dry extract | 46% |
|---|---|
| - Fatty material/dry extract | 71.5% |
| - Soluble nitrogen/total nitrogen | 1% |
| - pH | 5.20. |

The whipping is then carried out in a Jurion type whipping machine in the following conditions:

| - Temperature before whipping | 85°C |
|---|---|
| - Pressure | 1 kg/sq.cm. |
| - Speed | 340 rpm. |
| - Duration | 6 minutes. |

The product obtained, whose foaming coefficient is 1.2, is then put into small boat-shapes.

The product thus prepared has a duration of preservation exceeding 3 months at ordinary temperature.

Having now described my invention what I claim as new and desire to secure by Letters Patent is:

1. A process for preparing a processed cheese product in the form of a mousse without the use of jellifiers or thickeners comprising mixing a cheese composition containing cheese as the principal ingredient and polyphosphates to which is added at least one ingredient selected from the group consisting of powdered milk, cream, butter, casein and lactoserum at a temperature of 95°–100° C, cooling the mixture thus obtained and when the mixture is cooled to a temperature of 85°–75° C, whipping the mixture in an inert gas at a pressure of 0.5 to 1.5 kg/sq.cm., the amount of polyphosphates in said mixture being 1–3% based on the processed cheese and said mixture having at 95° C, before the whipping, a viscosity of 20–50 poises and after the whipping, a viscosity of 100–140 poises.

2. A process for preparing a processed cheese product in the form of a mousse without the use of jellifiers or thickeners comprising mixing a cheese composition containing cheese as the principal ingredient and polyphosphates to which is added at least one ingredient selected from the group consisting of powdered milk, cream, butter, casein and lactoserum at a temperature of 95°–100° C, and cooling the mixture thus obtained and when the mixture is cooled to a temperature of 85–75%, whipping the mixture in an inert gas at a pressure of 0.5 to 1.5 kg/sq.cm., the amount of polyphosphates in said mixture being 1.3% based on the processed cheese and said cheese composition having parameters chosen such that the representative point in a system of tridimensional coordinates having for coordinates the three parameters; dry extract, fatty material with respect to the dry extract and the content of the soluble nitrogen with respect to the total nitrogen is situated within a volume ABCD A'B'C'D' as shown in FIG. 1.

3. Process as claimed in claim 2 wherein the amount of water required for regulating the final dry extract of the composition to the desired value is added to the cheese composition containing polyphosphates before mixing the composition to a temperature of 95°–110° C.

* * * * *